United States Patent [19]

Seto et al.

[11] Patent Number: 5,484,993
[45] Date of Patent: Jan. 16, 1996

[54] CARD READER MAINTENANCE SYSTEM

[75] Inventors: Yoshiaki Seto; Masayuki Miyauchi; Takanobu Fujii, all of Tokyo, Japan

[73] Assignee: Tamura Electric Works, Ltd., Tokyo, Japan

[21] Appl. No.: 310,158

[22] Filed: Sep. 21, 1994

[30] Foreign Application Priority Data

Sep. 24, 1993 [JP] Japan .................................. 5-258932

[51] Int. Cl.⁶ .................................................. G06K 5/00
[52] U.S. Cl. ................................ 235/437; 395/185.07
[58] Field of Search .................................. 235/437, 379; 371/16.5

[56] References Cited

U.S. PATENT DOCUMENTS 4,932,028  6/1990  Katircioglu et al. .................... 371/16.5
5,424,522  6/1995  Iwata .................................... 235/437 X

FOREIGN PATENT DOCUMENTS 2183118  7/1990  Japan .

Primary Examiner—John Shepperd
Assistant Examiner—Michael G. Lee
Attorney, Agent, or Firm—Blakely, Sokoloff, Taylor & Zafman

[57] ABSTRACT

A card reader maintenance system includes a card reader and a maintenance apparatus. The card reader includes a card convey path for conveying an inserted card, a drive circuit for driving the card convey path, a recording/reproducing head, arranged on the card convey path, for recording/reproducing data on/from the card, a card processing circuit for sequentially executing, in accordance with a predetermined procedure, a plurality of card processes including a card convey process for controlling the drive circuit to convey the card to a position of the recording/reproducing head, a data reproducing process for causing the recording/reproducing head to reproduce data recorded on the card, and a data recording process for causing the recording/reproducing head to record data on the card, an error detection circuit for detecting an error in each card process while the card processing circuit executes the plurality of card processes, and an EEPROM for storing, on the basis of a detection output from the error detection circuit, error information indicating a card process in which an error has occurred. The maintenance apparatus includes a display unit for displaying the error information read out from the EEPROM during maintenance.

7 Claims, 3 Drawing Sheets

CARD READER MAINTENANCE SYSTEM

BACKGROUND OF THE INVENTION

The present invention relates to a maintenance stem for a card reader for performing various card processes such as a card convey process for conveying an inserted card and a process for recording/reproducing value information on/from the conveyed card.

In a vending machine for vending various articles using a prepaid card (to be referred to as a card hereinafter) on which prepaid value information is recorded, a card reader for reproducing the value information recorded on the card and recording remaining value information is arranged. When a card is inserted into such a card reader, the card is conveyed to the position of a recording/reproducing head in a card convey path by the rotation of a motor, the value information recorded on the card is read out, and the read value information of the card is displayed. In this case, when a user operates an article selection button of the vending machine to buy an article, the corresponding article is vended. At this time, in the card reader, value information corresponding to the amount of the vended article is subtracted from the read and displayed value information, remaining value information is written in the card by the recording/reproducing head, and then the card is conveyed in the card convey path and returned to a card return port.

In this card reader, each time a card is used, the above various card processes constituted by the card convey process and the process for writing/reading value information in/from the card are performed. If the card reader is broken, the broken card reader is returned to a factory so as to be repaired. However, in this case, since the card reader having an unknown broken portion is often returned to the factory, a cumbersome process must be performed to recognize the broken portion. As a result, a long time is required to repair the broken card reader.

SUMMARY OF THE INVENTION

It is an object of the present invention to provide a card reader maintenance system capable of quickly repairing a broken card reader.

It is another object of the present invention to provide a card reader maintenance system capable of easily recognizing a broken portion.

In order to achieve the above objects, according to the present invention, there is provided a card reader maintenance system comprising a card reader comprising a card convey path for conveying an inserted card, drive means for driving the card convey path, recording/reproducing means, arranged on the card convey path, for recording/reproducing data on/from the card, card processing means for sequentially executing, in accordance with a predetermined procedure, a plurality of card processes including a card convey process for controlling the drive means to convey the card to a position of the recording/reproducing means, a data reproducing process for causing the recording/reproducing means to reproduce data recorded on the card, and a data recording process for causing the recording/reproducing means to record data on the card, error detection means for detecting an error in each card process while the card processing means executes the plurality of card processes, and storage means for storing, on the basis of a detection output from the error detection means, error information indicating a card process in which an error has occurred, and a maintenance apparatus comprising display means for displaying the error information read out from the storage means during maintenance.

DESCRIPTION OF THE PREFERRED EMBODIMENT

The present invention will be described below with reference to the accompanying drawings.

Figure 3:
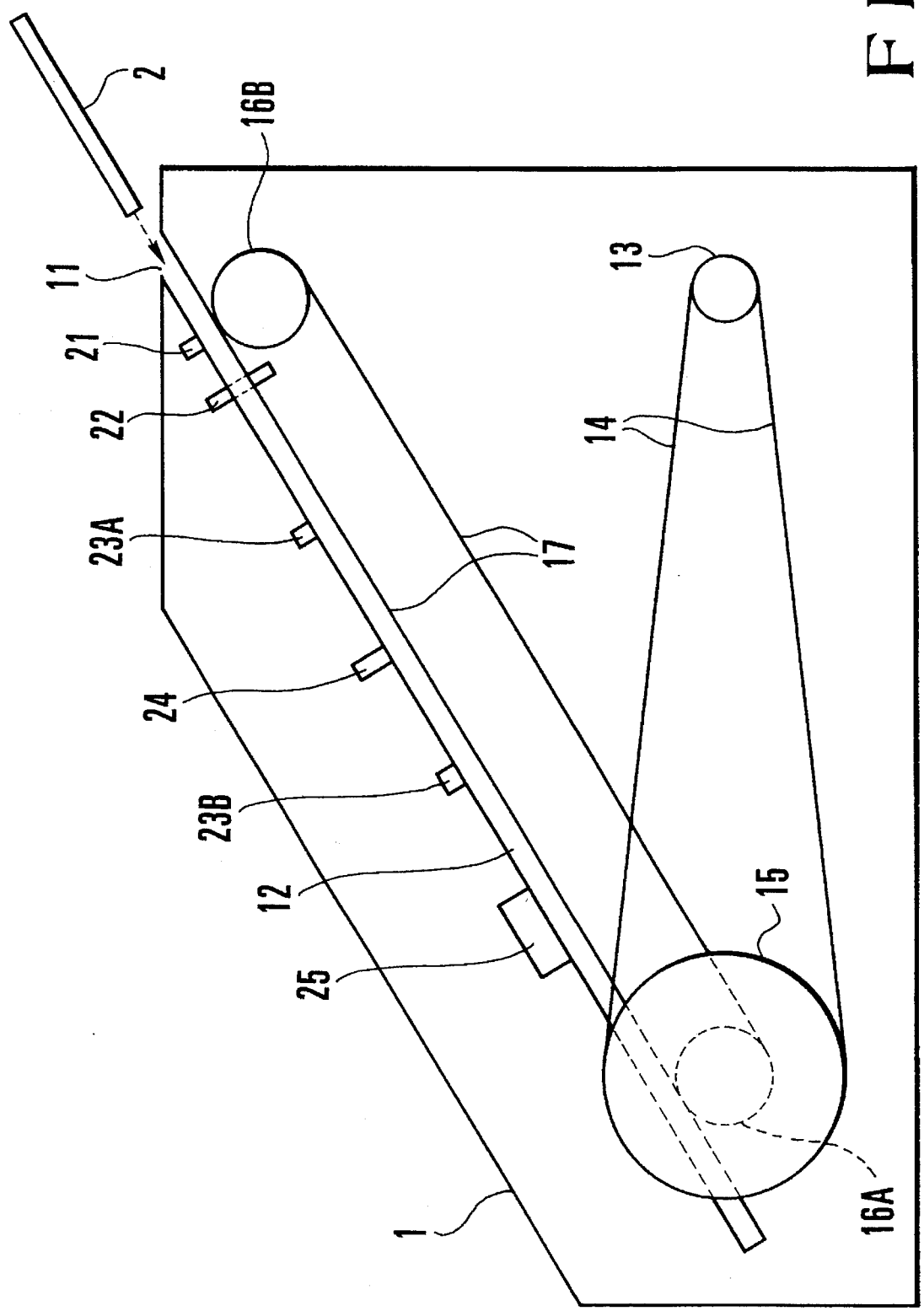
FIG. 3 is a sectional view showing the card reader shown in FIG. 1A.

FIG. 3 shows a card reader constituting a maintenance system according to an embodiment of the present invention. Referring to FIG. 3, reference numeral 1 denotes a card reader for performing various card processes to a prepaid card (to be referred to as a card hereinafter) 2 on which prepaid value information is magnetically recorded. The card reader 1 comprises a card slot 11 from/to which the card 2 is inserted/returned, a card convey path 12 for continuously conveying the card to the card slot 11, a motor 13 for driving the card convey path 12, belts 14 and 17 driven by the motor 13, a pulley 15 arranged such that the belt 14 is looped between the pulley 15 and the motor 13, and rollers 16A and 16B between which the belt 17 constituting the card convey path 12 is looped.

On the card convey path 12, an insertion detection sensor 21 for detecting insertion of the card 2 is arranged at a position communicating with the card slot 11, a shutter unit 22 for inhibiting two cards 2 from being simultaneously inserted, position sensors 23A and 23B each for detecting a predetermined position of the card 2 in the card convey path 12, a punch unit 24 for forming, in the card 2, a punch for displaying the index of remaining value information, and a head unit 25 constituted by a recording/reproducing head for magnetically recording/reproducing value information on/from the card 2 are arranged.

In this case, when the card 2 is inserted from the card slot 11, the motor 13 is rotated forward, and this rotational force is transmitted to the pulley 15 through the belt 14 to rotate the pulley 15. With rotation of the pulley 15, the roller 16A fixed and arranged coaxially with the pulley 15 is rotated. As a result, the roller 16B is rotated through the belt 17. Therefore, the inserted card 2 is conveyed in the card convey path 12 toward the head unit 25 by the convey operation of the belt 17 based on the rotation of the motor 13.

Figure 1:
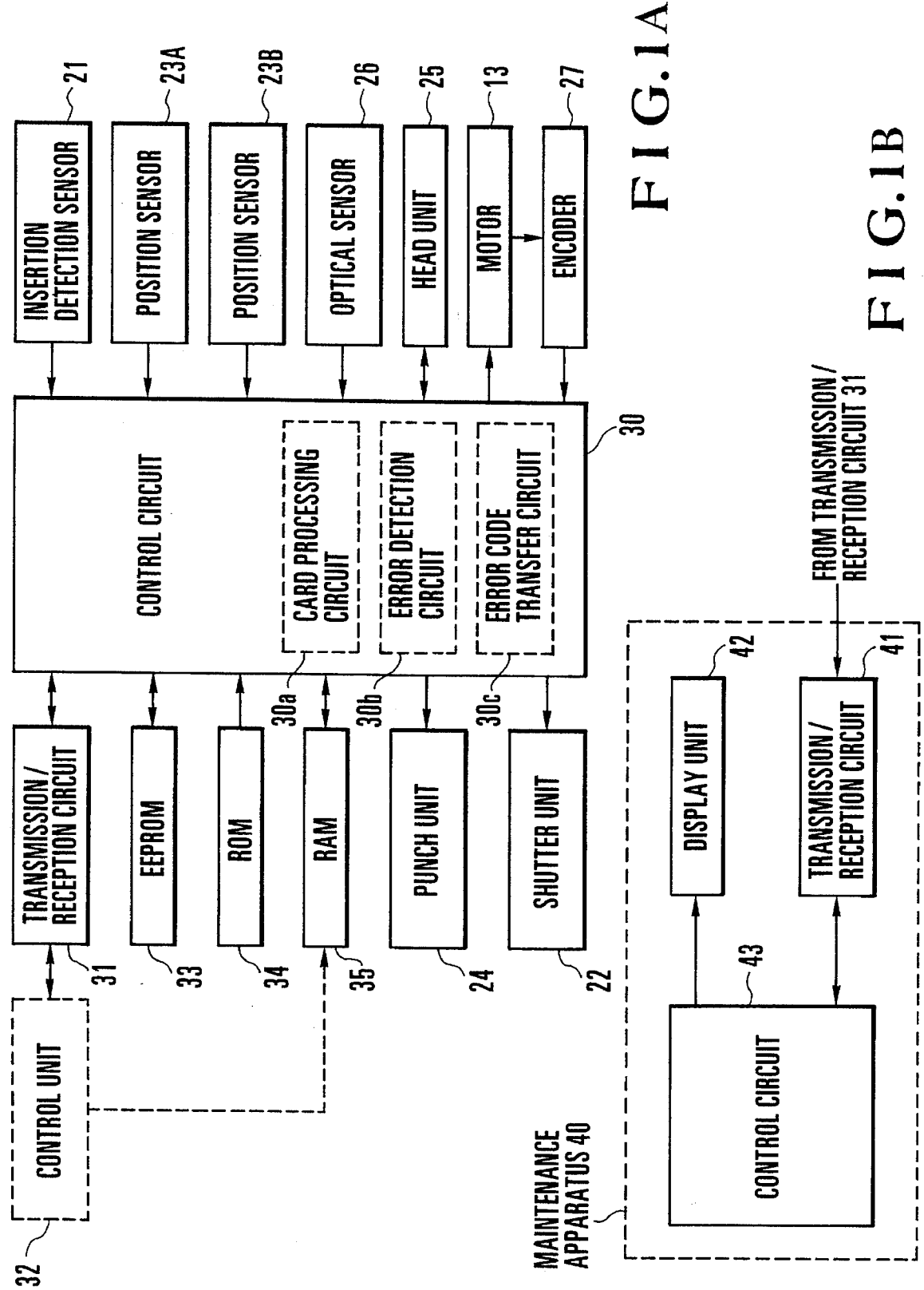
FIGS. 1A and 1B are block diagrams respectively showing a card reader and a maintenance apparatus which constitute a card reader maintenance system according to an embodiment of the present invention.

FIG. 1A shows a card reader arranged as described above. Referring to FIG. 1A, reference numeral 30 denotes a control circuit constituted by a CPU (Central Processing Unit) for entirely controlling the card reader. The control circuit 30 comprises a card processing circuit 30a for performing a plurality of card processes, an error detection circuit 30b for detecting an error in each of the plurality of card processes, an error code transfer circuit 30c for transferring, to a maintenance device (to be described later), error information stored during maintenance of the card reader. In addition, the control circuit 30 is connected, through a transmission/reception circuit 31, to a host apparatus, e.g., a control unit 32 of a vending machine to which a card reader is attached. The transmission/reception circuit 31 is used for exchanging data with the vending machine serving as a host apparatus during a vending service, and is also used for transmitting a stored error code to a maintenance apparatus when the card reader is broken, removed from the vending machine, and returned to a factory. In addition, the motor 13, the insertion detection sensor 21, the shutter unit 22, the position sensors 23A and 23B, the punch unit 24, and the head unit 25 which are shown in FIG. 3 are connected to the control circuit 30 of the card reader. An optical sensor 26 for detecting a bar code such as a card identification code printed on the card 2 in advance, an encoder 27 for detecting the rotational speed of the motor 13, an EEPROM (Electrically Erasable and Programmable Read Only Memory) 33 capable of electrically recording and erasing an error code and various data of the card reader, a ROM (Read Only Memory) 34 for storing programs to be executed by the control circuit 30, and a RAM (Random Access Memory) 35 for temporarily storing data are also connected to the control circuit 30.

In the card reader arranged as described above, when the card 2 is inserted, and its leading end is detected by the insertion detection sensor 21, the card processing circuit 30a of the control circuit 30 opens the shutter unit 22 and rotates the motor 13 forward to receive the card 2. When the card 2 is received into the card convey path 12, the card processing circuit 30a monitors detection outputs from the position sensors 23A and 23B to convey the card 2 in the card convey path 12 to the position of the head unit 25. In this case, a convey operation from when the trailing end of the conveyed card 2 is detected by the position sensor 23B to when the magnetic data recorded area of the card 2 reaches a position where the data is reproduced is controlled on the basis of the rotational speed of the motor 13 obtained through the encoder 27.

More specifically, when the trailing end of the card 2 is detected by the position sensor 23B, the rotational speed of the motor 13 is started to be measured. When the measurement value reaches a predetermined value, the cards processing circuit 30a stops the motor 13 and drives the head unit 25 to reproduce data consisting of value information from the data recorded area of the card 2. Thereafter, data consisting of remaining value information is recorded on the card 2. The motor 13 is rotated backward, the punch unit 24 forms a punch at the position of a remaining amount index of the card 2 as needed, and the card 2 is discharged to the card slot 11.

The card reader 1 is constituted by the various parts as described above, the card processing circuit 30a of the control circuit 30 performs a series of various card processes constituted by the card convey process, a data reproducing/recording process, the punching process, and the card discharge process for the card 2, and performs a communication process with the control unit 32 serving as a host apparatus.

FIG. 1B shows an embodiment of a maintenance apparatus connected to a card reader when the card reader is broken. A maintenance device 40 comprises a transmission/reception circuit 41, connected to the transmission/reception circuit 31 of the card reader, for transmitting/receiving data, a display unit 42 for displaying error data transferred from the card reader and received by the transmission/reception circuit 41, and a control circuit 43 for controlling a data transmitting/receiving operation and a display operation.

An operation performed when the card reader shown in FIG. 1A is connected to the maintenance device 40 shown in FIG. 1B will be briefly described below. When the card reader 1 constituted by the various constituent elements is broken and returned to a factory as a card reader to be repaired, a portion to be repaired cannot be specified in the factory, and a long time is required to repair the broken card reader. For this reason, in this card reader, when an error has occurred in the above card processes, the error detection circuit 30b stores an error code corresponding to an error portion in the EEPROM 33. The error code is stored in the EEPROM 33 as described above, and the card reader is connected to the maintenance device 40 when the returned card reader is repaired in the factory. In the card reader connected to the maintenance device 40, the error code transfer circuit 30c of the control circuit 30 performs a transfer process such that the error code stored in the EEPROM 33 is read out to be transmitted from the transmission/reception circuit 31 to the maintenance device 40. The maintenance device 40 receives the error code transferred from the card reader through the transmission/reception circuit 41 and displays the received error code on the display unit 42 or converts the error code into another data to display it on the display unit 42. In this manner, a card process in which the card reader is broken can be recognized, and the broken various constituent parts such as the motor 13 and the head unit 25 can be quickly repaired.

Figure 2:
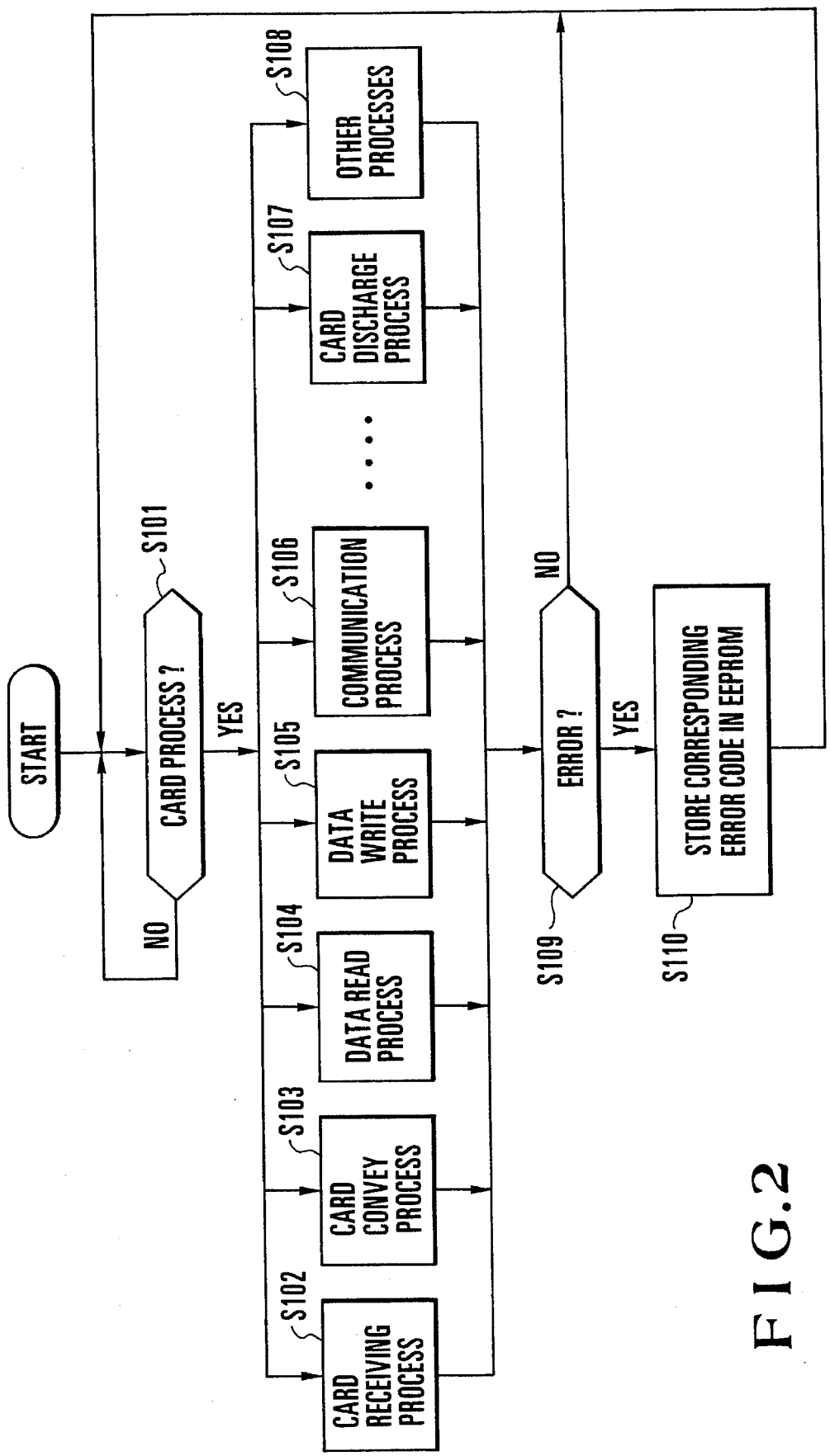
FIG. 2 is a flow chart showing the operation of the card reader shown in FIG. 1A.

FIG. 2 shows the main part of the operation of the card reader, and shows the operations of the card processing circuit 30a and error detection circuit 30b of the control circuit 30.

More specifically, when the card reader 1 is powered on, the card processing circuit 30a of the control circuit 30 starts processes. When insertion of the card 2 is detected through the insertion detection sensor 21 in step S101, a card receiving process for driving the motor 13 to receive the card 2 into the card convey path 12 is executed in step S102. In step S109, the error detection circuit 30b of the control circuit 30 detects and checks whether an error has occurred in this card receiving process. If YES in step S109, a corresponding error code is stored in the EEPROM 33 in step S110, and the flow returns to step S101. On the other hand, if NO in step S109, the flow returns from step S109 to step S101.

Note that the EEPROM 33 has a storage capacity capable of storing, e.g., 20 pieces of error information. If the 21th error information is generated, the oldest error information is erased, and the 21th error information is stored in the area where the oldest error information has been erased.

When the card 2 is received into the card convey path 12, "YES" is determined in step S101, and a card convey process shown in step S103 for conveying the card 2 is executed. The detection outputs from the position sensors 23A and 23B are monitored during this process to detect whether an error such as a card jam has occurred. When the error is detected, "YES" is determined in step S109, a corresponding error code is stored in the EEPROM 33 in step S110 as described above, and the flow returns to step S101. More specifically, when no convey operation of the card 2 is detected by the position sensors 23A and 23B within a predetermined period of time, or when the card 2 is continuously detected for the predetermined period of time or more, the control circuit 30 determines a card jam and stores an error code corresponding to the position sensors 23A and 23B which have detected an error.

When the card 2 is conveyed to a position where the head unit 25 is arranged, "YES" is determined in step S101, and a data read process for reading the data of the card 2 through the head unit 25 is performed in step S104. Thereafter, the presence/absence of an error is checked in step S109. If YES in step S109, a corresponding error code is stored in the EEPROM 33 in step S110, and the flow returns to step S101.

Upon completion of a service using the card 2, "YES" is determined in step S101, and a data write process in step S105 is executed. As described above, it is checked in step S109 whether an error is detected. If YES in step S109, a corresponding error code is stored in the EEPROM 33.

Subsequently, similarly, "card process?" in step S101 is checked, and the card processes constituted by the communication process in step S106 and the card discharge process in step S107 are sequentially executed. Other processes such as a bar code detection process and a punching process in step S108 are executed during the above card processes. When an error is detected during each card process, and "YES" is determined in step S109, a corresponding error code is similarly stored in the EEPROM 33 in step S110.

Note that, although the card processes are sequentially executed as described above, steps S102 to S108 are parallelly shown in FIG. 2 for descriptive convenience.

As described above, the card reader is constituted such that the error detection circuit 30b of the control circuit 30 detects an error in each of the card processes sequentially executed by the card processing circuit 30a, and that an error code corresponding to a card process in which an error has occurred is stored in the EEPROM 33. For this reason, when a card reader is broken and returned to a factory so as to be repaired, the error code transfer circuit 30c transfers the contents of the EEPROM 33 to the maintenance device 40 to display them. In this case, an error history indicating specific card processes in which errors have occurred in this card reader in the past can be clearly recognized. Therefore, when parts related to the process in which the error has occurred are checked and replaced with new ones, the broken card reader can be quickly repaired.

Note that, in this embodiment, although each error code is stored in the EEPROM 33, each error code may be stored in the RAM 35 whose contents are backed up by a battery or the like.

When an error has occurred in the communication process, and the card reader cannot transmit/receive data to/from the maintenance device 40, the EEPROM 33 may be removed from a socket, and the data may be read out by a reader/writer device. In addition, when errors have occurred in the card processes, the data of these errors may be read out by the reader/writer device.

As has been described above, according to the present invention, when errors occur in card processes executed in a card reader, corresponding pieces of error information are sequentially stored and held in a storage means, and the stored pieces of error information are read out and displayed by a maintenance apparatus. For this reason, when the card reader is broken and returned to a factory so as to be repaired, card processes in which errors have occurred in the past can be recognized at a glance. As a result, the error information certainly helps the maintenance apparatus to repair the card reader. Therefore, parts related to the process in which an error has occurred are checked and replaced with new ones, and the broken card reader can be quickly repaired.

What is claimed is:

1. A card reader maintenance system comprising:

a card reader comprising a card convey path for conveying an inserted card, drive means for driving said card convey path, recording/reproducing means, arranged on said card convey path, for recording/reproducing data on/from said card, card processing means for sequentially executing, in accordance with a predetermined procedure, a plurality of card processes including a card convey process for controlling said drive means to convey said card to a position of said recording/reproducing means, a data reproducing process for causing said recording/reproducing means to reproduce data recorded on said card, and a data recording process for causing said recording/reproducing means to record data on said card, error detection means for detecting an error in each card process while said card processing means executes the plurality of card processes, and storage means for storing, on the basis of a detection output from said error detection means, error information indicating a card process in which an error has occurred; and a maintenance apparatus comprising display means for displaying the error information read out from said storage means during maintenance.

2. A system according to claim 1, wherein said storage means is constituted by an electrically erasable and programmable read only memory.

3. A system according to claim 1, wherein said card reader comprises error information transfer means for reading out the error information stored in said storage means to transfer the error information to said maintenance apparatus, and said maintenance apparatus is connected to said card reader during maintenance to cause said display means to display the error information transferred by said error information transfer means.

4. A system according to claim 3, wherein said card reader comprises first data transmission/reception means for transmitting/receiving data to/from a service apparatus in which said card reader is arranged, said maintenance apparatus comprises second data transmission/reception means for transmitting/receiving data to/from said first data transmission/reception means during maintenance, and error information is transferred from said card reader to said maintenance apparatus through said first and second transmission/reception means.

5. A system according to claim 1, wherein said card reader is arranged in a service apparatus for offering a predetermined service to a user, said card is a prepaid card on which value information corresponding to a prepaid amount is recorded in advance, and said card processing means reads out the value information recorded on said prepaid card in a data reproducing process and records, on said prepaid card, remaining value information obtained by an amount corresponding to a service offered by said service apparatus.

6. A card reader comprising:

a card convey path for conveying an inserted card;

drive means for driving said card convey path;

recording/reproducing means, arranged on said card convey path, for recording/reproducing data on/from said card;

card processing means for sequentially executing, in accordance with a predetermined procedure, a plurality of card processes including a card convey process for controlling said drive means to convey said card to a position of said recording/reproducing means, a data reproducing process for causing said recording/reproducing means to reproduce data recorded on said card, and a data recording process for causing said recording/reproducing means to record data on said card;

error detection means for detecting an error in each card process while said card processing means executes the plurality of card processes; and storage means for storing, on the basis of a detection output from said error detection means, error information indicating a card process in which an error has occurred.

7. A card reader according to claim 6, further comprises data transmission/reception means for transmitting/receiving data to/from a service apparatus in which said card reader is arranged, and error information transfer means for reading out error information stored in said storage means during maintenance to transfer the error information to an external apparatus for maintenance through said data transmission/reception means.

* * * * *

UNITED STATES PATENT AND TRADEMARK OFFICE
CERTIFICATE OF CORRECTION

PATENT NO. : 5,484,993
DATED : January 16, 1996
INVENTOR(S) : Seto et al.

It is certified that errors appear in the above-identified patent and that said Letters Patent is hereby corrected as shown below:

In the abstract section [57] at line 10, please delete " -the " and insert -- the --.

In column 1 at line 5, please delete " stem " and insert -- system --.

In column 3 at line 39, please delete " cards " and insert -- card --.

Signed and Sealed this

Tenth Day of September, 1996

Attest:

BRUCE LEHMAN

Attesting Officer

Commissioner of Patents and Trademarks